Oct. 13, 1970 F. A. WILDER 3,533,633

AUTOMATIC REVERSING TAPE TRANSPORTING SYSTEM

Filed Nov. 15, 1967 3 Sheets-Sheet 1

INVENTOR:
FRANK A. WILDER,

BY W. S. Wolfe

HIS ATTORNEY.

INVENTOR:
FRANK A. WILDER,
BY W. S. Wolfe
HIS ATTORNEY.

Oct. 13, 1970 F. A. WILDER 3,533,633

AUTOMATIC REVERSING TAPE TRANSPORTING SYSTEM

Filed Nov. 15, 1967 3 Sheets-Sheet 3

INVENTOR:
FRANK A. WILDER,

BY W. S. Wolfe
HIS ATTORNEY.

United States Patent Office 3,533,633

Patented Oct. 13, 1970

3,533,633

AUTOMATIC REVERSING TAPE TRANSPORTING SYSTEM

Frank A. Wilder, New Hartford, N.Y., assignor to General Electric Company, a corporation of New York Filed Nov. 15, 1967, Ser. No. 683,226

Int. Cl. G11b *15/26*

U.S. Cl. 274—4 16 Claims

ABSTRACT OF THE DISCLOSURE

In a cassette recorder, a carriage supports a magnetic head and dual pinch rollers on either side thereof, the carriage having first and second positions thereby allowing the pinch rollers to be brought into and out of a position of engagement with dual capstans. The carriage also supports a plate which is moveable with respect to the carriage and in response to signals from a means sensing the end of a tape moving on dual reel hubs. Movement of the plate with respect to the carriage will alternately engage and disengage each of the pinch rollers with a corresponding capstan and the reel hub drive means with one of the reel hubs.

BACKGROUND OF THE INVENTION

In the tape recording industry, it has long been the practice to record on at least two tracks of a tape in order to maximize the amount of information carried by a single tape. In the earliest of recorders, the tape reels were manually reversed between the reel hubs once the tape reached the end in order to achieve a two-track recording. Although this method was in itself efficient so far as full utilization of a tape was concerned, it was undesirable in that it prohibited continuous recording and playing of a tape without the intervention of an operator.

As the tape recorder art became more sophisticated, means for sensing the end of a reel began to appear. The sensing means which had various forms were all capable of providing a signal which could be used to reverse the direction of a motor or provide a signal for actuating electromechanical means capable of mechanically reversing the direction of a tape drive.

In their more sophisticated forms, these reversing mechanisms included a moveable plate which could alternately engage a first pinch roller with a first capstan tape drive and a second pinch roller with a second capstan tape drive in order to achieve a reversal in the direction of tape drive. These reversing mechanisms were also capable of reversing the drive at the reel takeup hubs simultaneously with the reversal of the capstan drive to thereby effect a completely automatic operation.

However, the somewhat complex nature of the automatic reversing mechanism led to difficulties in threading the tape past the head. These difficulties arose from the fact that the mechanism necessary to provide alternate engagement between the pinch rollers and the capstans as well as the reel hubs and the drive means seemed to preclude the mobility of the tape head and the pinch rollers which was generally considered necessary in order to avoid manual threading.

As a result, the automatic reversing mechanisms of the prior art are substantially unusable for the now popular cassette recorder. The nature of the cassette itself which comprises a rigid case to be mounted upon reel hubs not only requires a movable head but additionally requires pinch rollers which are capable of movement substantially independently of the movement necessitated by the automatic reversing mechanism. In other words, the automatic reversing mechanism for a cassette recorder requires subsequent movement of the pinch rollers which is substantially independent of the initial joint movement of the magnetic head and the pinch rollers. Also, in order to achieve an automatically reversible cassette recorder, it is necessary to provide somewhat complicated mechanisms to achieve this independent movement and do so in an extremely limited space so as not to destroy the reduced size advantage of a cassette recorder.

SUMMARY OF THE INVENTION

In view of the shortcomings of the prior art and the realities of the tape recorders of today and tomorrow, it is a first object of this invention to achieve an automatically reversible cassette tape recorder.

It is still further an object of this invention to achieve an automatically reversible tape recorder which is of generally small dimensions.

In one embodiment of the invention, consistent with the above objectives, there is provided a magnetic tape apparatus comprising support means with dual capstans, dual reel hubs, and reel hub drive means mounted thereon. The apparatus further comprises a carriage which lies substantially parallel with the support means and capable of movement between a first and a second position. The carriage supports dual pinch rollers which may be moved into an engagement position with respect to the capstans while actual engagement with the capstans is controlled by a plate capable of movement between first and second positions in response to means for sensing the end of a tape. The plate further controls the alternate engagement of the dual reel hubs and drive means movable with respect thereto.

BRIEF DESCRIPTION OF THE DRAWINGS

The invention may be understood from the following description taken in connection with the accompanying drawings in which.

DESCRIPTION OF THE PREFERRED EMBODIMENT

Figure 1:
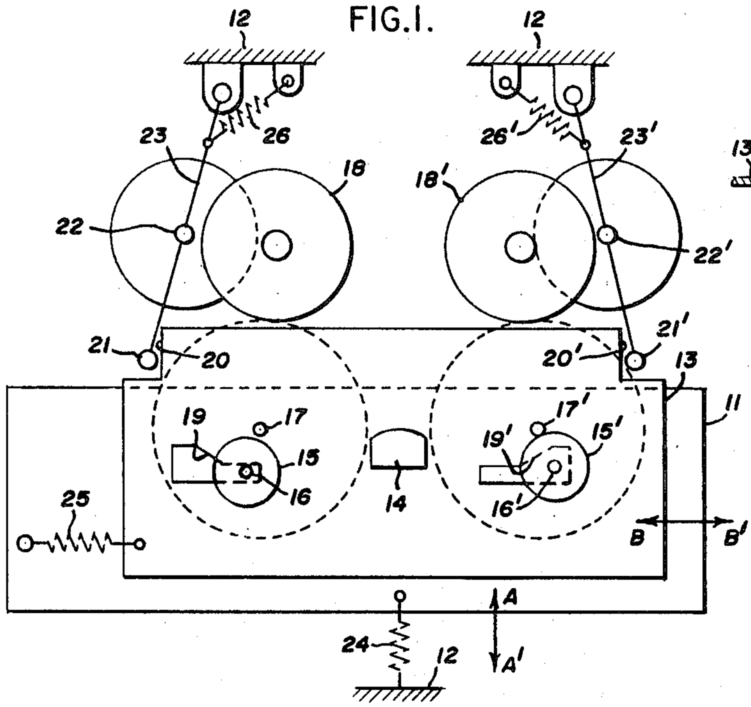
FIG. 1 is a schematic diagram of the tape deck of a recorder utilizing a sliding plate arrangement.

The embodiment as shown in FIG. 1 comprises a carriage 11 which is mounted for movement with respect to a support means 12 along a direction A–A′ with a first position corresponding to the A direction and a second position corresponding to the A′ direction. Similarly, a sliding plate 13 is mounted for movement with respect to the carriage 11 along the direction B–B′ with a first position corresponding to the direction B and a second position corresponding to the direction B′. When the carriage 11 is in the A position as shown, a magnetic head 14 and dual pinch rollers 15–15′ mounted thereon are brought into an engagement position of substantial alignment with dual capstans 17–17′ which are fixed to the support means 12. Hence, in the A position as shown, a tape mounted on dual reel hubs 18–18′ would be engaged by the magnetic head 14 and the combination comprising the pinch roller 15′ and the capstan 17′.

However, movement of the plate 13 from the B position into the B′ position will disengage the pinch roller 15′ from the capstan 17′ along with the intermediately positioned tape and engage the pinch roller 15 with the capstan 17 along with the intermediately positioned tape. This is accomplished by providing apertures defining cammed surfaces 19–19′ in the plate 13 which bear upon shafts 16–16′ of the pinch rollers 15–15′. Thus, movement of the plate 13 to the B′ position would force the shafts 16–16′ to follow the cammed surfaces 19–19′.

In addition, extensions 20–20′ of the plate 13 alternately bear upon engagement means 21–21′ of the drive means 22–22′. Since the engagement means 21–21′ are connected to the support means 12 by radially extending arms 23–23′ of the drive means 22–22′, movement of the plate 13 from the B position to the B′ position will ultimately disengage extension 20 from engagement means 21 and engage extension 20′ with engagement means 21′ to effect an engagement of the drive means 22 with the reel hub 18 and disengagement of the drive means 22′ from the reel hub 18′.

In order to simplify the schematic, the necessary force to effect movement of the carriage 11 in the A′ direction has been shown as provided by spring means 24 while the necessary force to provide movement between the plate 13 with respect to the carriage 11 and in the B direction has been shown as provided by spring bias means 25. Similarly, spring bias means 26–26′ connecting radially extending arms 23–23′ with the support means 12 have been shown. Additional and similar biasing means not shown would be associated with the pinch rollers 15–15′ to urge each pinch roller toward the associated capstan 17–17′.

Figure 2:
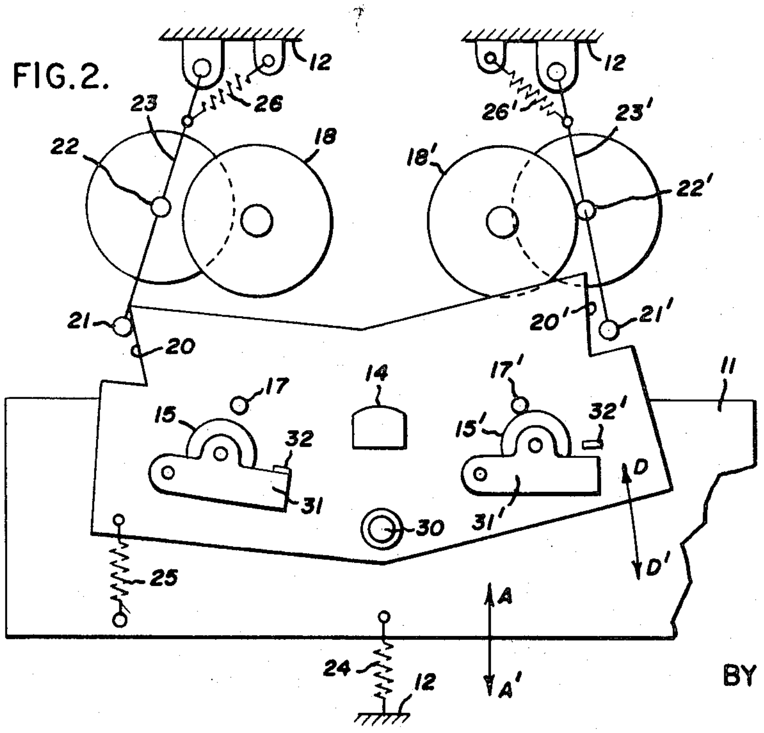
FIG. 2 is a schematic diagram of the tape deck of a recorder utilizing a pivoting plate arrangement.

An embodiment utilizing a rotating plate arrangement is shown in FIG. 2 as substantially similar to the sliding plate arrangement. Here, the carriage 11 is again shown as moving along the direction A–A′ between a first position of engagement in the A direction and a second position of disengagement in the A′ direction. Similarly, the plate 13 is shown as moving about an arcuate path D–D′ between a first position in the D direction and a second position in the D′ direction. Plate 13 is thus free to pivot about pivot member 30 and alternately engage pinch roller brackets 31–31′ which are secured to the carriage 11 by stop means 32–32′ mounted on the plate 13. Thus, as with the sliding plate arrangement, movement of the carriage 11 to the A position engages the tape at the magnetic head 14 and between one of the pinch rollers 15–15′ and a corresponding one of the capstans 17–17′. Movement of the plate 13 from the D position to the D′ position will disengage the pitch roller 15′ by bringing the stop or engagement means 32′ into contact with the bracket 31′ and engage the pitch roller 15 with the capstan 17 by moving the stop or engagement means 32 away from the bracket 31. In addition, movement of the plate 13 to the D′ position will bring the extension 20′ into contact with the engagement means 21′ to disengage the drive means 22′ from the reel hub 18′ while the extension 20 will disengage the engagement means 21 to bring the drive means 22 into engagement with the reel hub 18.

Figure 3:
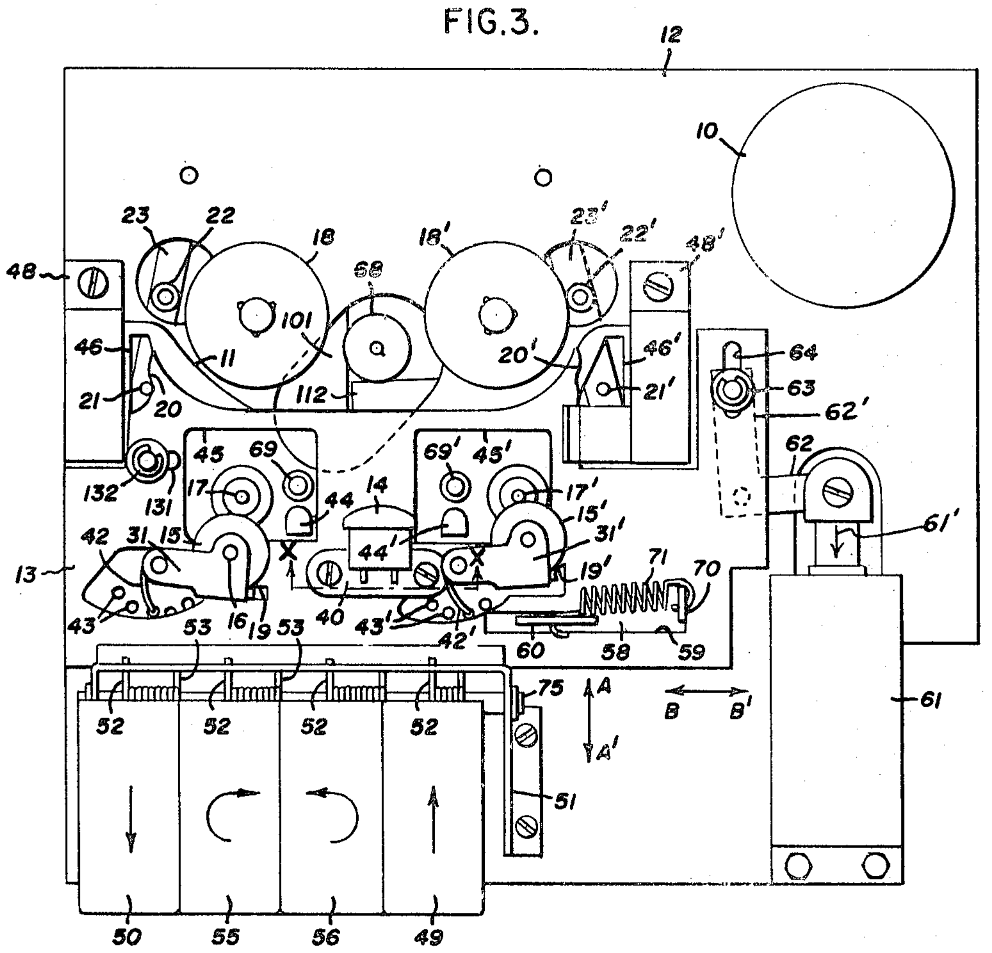
FIG. 3 is a plan view of the tape deck of a recorder utilizing a sliding plate arrangement.

So as to provide a more detailed understanding of the schematic illustration of the sliding plate arrangement, reference is now made to a mechanical embodiment of the invention. In FIG. 3, there is disclosed the support means 12 on which a motor 10 is affixed and a carriage 11 is mounted for movement between the position A–A′. The carriage 11 is essentially a plate-like member with a plurality of apertures therethrough to allow passage of members from the support means 12 and the mounting of the plate 13 along with other elements thereon. In particular, the carriage 11 carries the magnetic head 14 and a mounting bracket 40 in such a way as to allow a freedom in movement of the plate 13. The carriage 11 is also secured to spring bias means 42–42′ associated with each of the mounting brackets 31–31′ of the pinch rollers 15–15′ so as to assure proper biasing and ultimate engagement of the pinch rollers 15–15′ with the respective capstans 17–17′. This is achieved by inserting the spring means 42–42′ into one of a plurality of apertures 43–43′ in the carriage 11. The plurality of apertures 43–43′ allows a variable bias of the pinch rollers 15–15′ to be achieved so as to satisfy the particular needs of the apparatus. In addition, the carriage 11 provides support means for dual erase heads 44–44′. The erase heads 44–44′, the capstans 17–17′, and cassette positioning posts 69–69′ extend through apertures 45–45′ in the plate 13. When the carriage 11 is in the A position, there is a substantially linear disposition of the magnetic head 14, capstans 17–17′, and the erase heads 44–44′. Significantly, the carriage 11 also includes apertures 46–46′ which overlie comparable apertures in the support means 12 to allow passage of the engagement means 21–21′.

Thus, the carriage 11 in serving a support function is able to move a substantial number of elements between the positions A–A′ with the aid of guide means not shown and control buttons 49 and 50 respectively. The buttons which are secured to a bracket 51 include fingers 52 which move through slots in the bracket 51 pursuant to the spring biasing by resilient members 53 along a mounting shaft 75. In addition, adjacent fast forward and fast reverse buttons 56 and 55 are provided with similar fingers 52 and a spring bias means 53 which effect movement of a fast drive means 68 into drive positions with respect to the reel hubs 18–18′, pursuant to motion of a lever. Motion in a direction normal to the carriage 11 is restricted by guide means 48–48′.

As emphasized previously, a mere movement of a carriage carrying a magnetic head and erase heads into engagement with a tape is not sufficient to provide a mechanism effecting automatic reversal of the tape. In order to provide automatic reversal, the plate 13 is so fashioned as to provide an elongated aperture 58 with substantially linear guide surfaces 59 between which a guide member 60 of the carriage 11 may pass. The surfaces 59 along with guide slot 131 and connective means 132 provide a substantially linear motion of the plate 13 when a sensing means not fully shown but including a solenoid 61 having an armature movable in the direction of the arrow 61′ is actuated by a signal indicating the end of a tape. The actual linear motion may be achieved by a pivoting L-shaped lever arrangement comprising an arm 62 secured to the movable armature of the solenoid 61 and an integral transverse portion 62′ (shown dotted) secured to the plate 13 by a loose connective means 63 at an elongated aperture 64. With this actuating arrangement and a spring biasing arrangement including a tab 70 and a connective spring 71, the plate 13 is able to slide linearly between the positions B–B′. The result is the alternate engagement and disengagement of the pinch rollers 15–15′ with the capstans 17–17′ pursuant to the camming of the pinch rollers 15–15′ on the surfaces 19–19′ only partially shown and the alternate engagement and disengagement of the drive means 22–22′ pursuant to the camming of the engagement means 21–21′ by extensions 20–20′. As in FIG. 1, the drive means 22′ is presently in the B position and is engaging the reel hub 18′ in response to a spring biasing of the radially extending arm 23.

Figure 4:
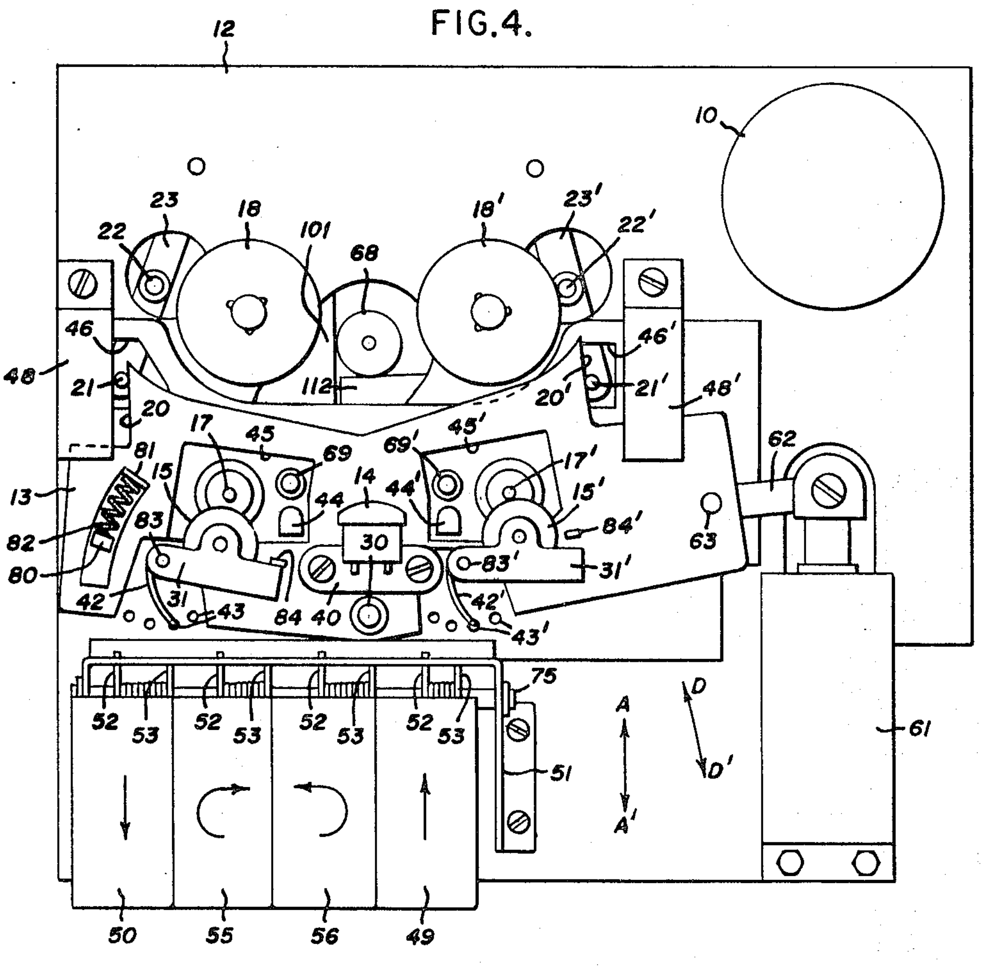
FIG. 4 is a plan view of the tape deck of a recorder utilizing a pivoting plate arrangement.

The mechanical embodiment of the pivoting plate arrangement is quite similar to that of the sliding plate arrangement, as shown in FIG. 4. It comprises the pivot member 30 which may be analogized to the elongated slot 58 of the sliding plate arrangement in that it provides a necessary restriction of movement on the rotating plate 13 which is of a slightly different shape than the analogous sliding plate. However, an additional guide member 80 of the carriage 11 is connected to a tab 81 of the plate 13 by spring biasing means 82, in order to assure return of the plate to the D position.

In the particular embodiment disclosed, the pinch rollers 15–15′ are secured to the carriage 11 at their support shafts 83–83' as well as at the spring bias means 42–42'. In order to achieve the necessary pivotal function of the pinch rollers 15–15' for engagement of the capstan 17–17', stop means 84–84' which extend from the plate 13 are provided. In the D position as shown, stop member 84' has been pivoted out of engagement with the bracket 31' while stop member 84 is in engagement with bracket 31. As a result, the pinch roller 15' is engaged with the capstan 17' and the pinch roller 15 is disengaged from the capstan 17.

Since the pivotal motion requires a somewhat different actuating mechanism a somewhat simplified lever arm arrangement has been provided in combination with the solenoid 61. In essence, there is provided a substantially rigid connection between the arm 62 and the plate 13 at connective means 63.

It should be appreciated that the pivoting plate arrangement does not require the mounting of the pinch rollers 15–15' on the carriage 11. In fact, the pinch rollers may be mounted directly upon the plate 13 to pivot into and out of engagement with the capstans 17–17' by the mere rotation of the plate 13 alone.

Figure 5:
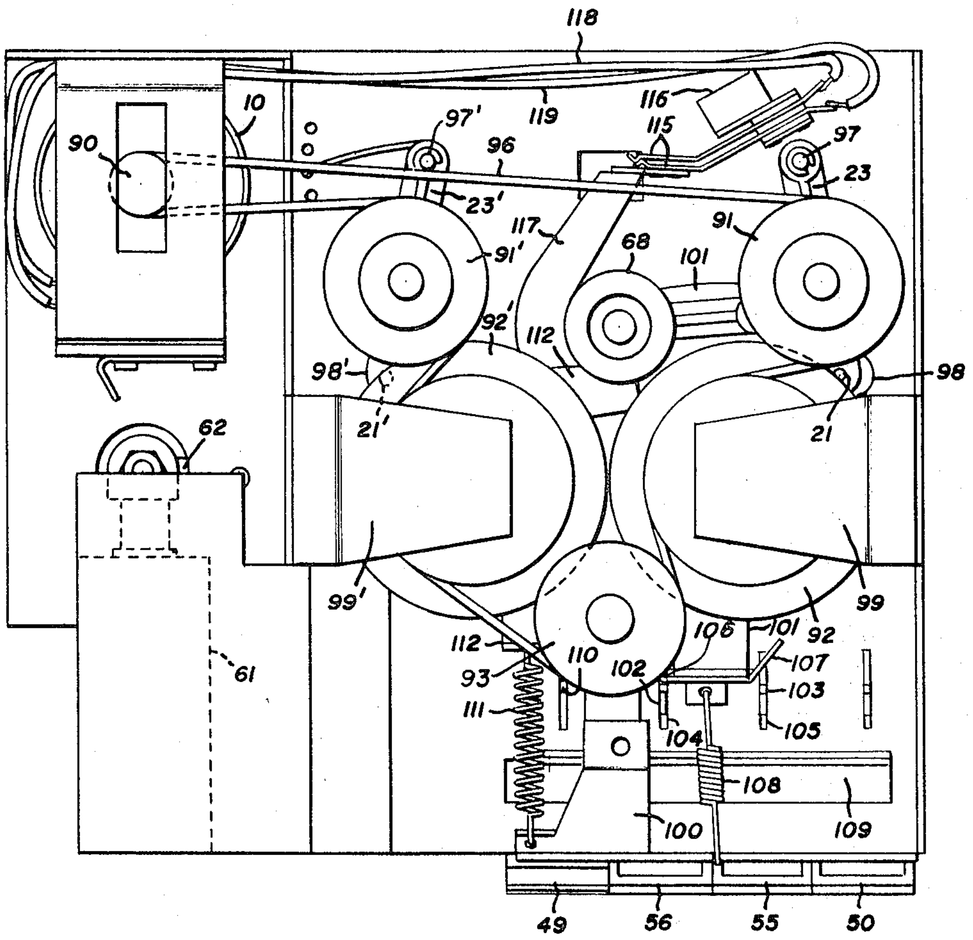
FIG. 5 is a bottom view of the tape deck of a recorder in either a sliding or pivoting plate arrangement.

Because of the substantial similarities between sliding plate and the pivoting plate embodiment of the invention, the control means and the drive means therefor may be substantially identical as shown in FIG. 5. A particular aspect of the drive means which allows considerable simplification and therefore reduction in size of the overall unit, be it of the pivoting or sliding plate form, is the utilization of a single drive belt 96 which is connected to a pulley 90 of the motor 10 and bears upon pulleys 91–91' of drive means 22–22' and flywheels 92–92' of capstans 17–17'. An idler pulley 93 is also provided in order to allow all of the rotating members to proceed in the correct direction of rotation while transmitting sufficient tractive force by means of the single belt 96. The capstan flywheels 92–92' are retained in a fixed position by thrust bearing brackets 99–99' which are secured to the support means 12. The idler pulley 93 is pivotally mounted on a bracket 100 secured to the support means 12.

In order to provide a clutch function at the drive means 22–22', the radially extending arms 23–23' are pivotally secured to the support means 12 at points 97–97'. Apertures 98–98' at the opposite ends of the arms 23–23' allow engagement means 21–21' to extend through the support means 12 to the extensions 20–20'.

The fast drive means 68 is also pivotally mounted on a lever 101 to provide an idler function which is controlled by buttons 55 and 56. The buttons 55 and 56 include projections 102 and 103 extending through slots 104 and 105 of the support means 12. The projections 102 and 103 may alternately engage cammed surfaces 106 and 107 respectively when buttons 55 and 56 are alternately depressed. When the projection 102 engages a cammed surface 106, the lever 101 is forced to pivot the fast drive means 68 into position against capstan flywheel 92'. When the button 55 is released, the spring bias means 108 will return the drive means 68 to a disengaged position. Similarly, engagement of the cam surface 107 with the projection 103 will force the drive means 68 into engagement with the capstan flywheel 92. In actuality, the release of the buttons 55 and 56 may be effected by the button 50 which includes release means in the form of a spring biased clearing bar 109 well known in the art.

The same release button 50 may also serve to release the carriage from A position. Depression of the button 49 would force a projection 110 forward against the force of a biasing spring 111 to drive a lever 112 and the connected carriage 11 to the A position along with the fast drive means 68. In addition, movement of the projection 110 in response to depression of the button 49 will effect a closure of switch members 115 carried by mounting means 116. In the case of the switch 115, a lever 117 is acted upon by anyone of the projections 102, 103, and 110 when the respective buttons 56, 55 and 49 are depressed.

Although the complete electrical connections are not shown, lines 118 and 119 may be seen as completing a series circuit to the motor 10 when the switch means 115 are closed.

It should be appreciated that the precise nature of the drive means 22–22' of the reel hubs 18–18' may be varied and still lie within the scope of the invention. In particular, a so-called split hub arrangement may be utilized which would require the mounting of a drive means 22–22' on shafts extending through the reel hubs 18–18' so as to allow movement along the individual shafts. The resulting alternate engagement and disengagement of the drive means 22–22' and the reel hubs 18–18' is substantially similar to the specific embodiment disclosed herein except that the motion therebetween is along the axis of rotation as opposed to normal thereto.

Figure 6A:
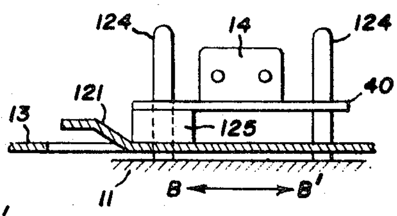
FIGS. 6*a* and 6*b* are sectional views taken along section line X—X of FIG. 3 wherein the recorder utilizes a cammed magnetic head.
Figure 6B:
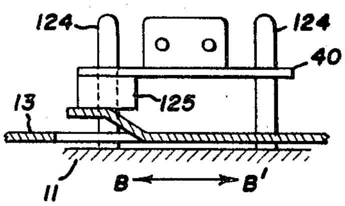

Also, it should be appreciated that the reversible nature of the recording apparatus will require provisions at the magnetic head 14 which allow for recording and playback of tape information along two or four vertically disposed tracks. The necessary provisions may take the form of a head utilizing plural elements selectively switched by the means for sensing the end of a tape as shown in FIGS. 1–4 or in the alternative, a single head may be utilized which is vertically moved in response to the sensing means. The single head approach as shown in FIGS. 6 (*a* and *b*) requires a camming surface 121 secured to the plate 13. The magnetic head 14 is secured to a bracket 40 which should be spring biased to an unelevated state. Spindles 124 which are secured to the carriage 11 pass through the plate 13 which extend in the B–B' direction and through apertures in the bracket 40. When the camming surface 121 is slid under a cammed surface comprising a spindle mounted spacer 125, the bracket 40 and the head 14 will move from an unelevated state corresponding to the B position to an elevated state corresponding to the B' position. It should be appreciated that the cammed surface 121 is equally adaptable to a pivoting plate arrangement.

Furthermore, it should be appreciated that the form of the means for sensing the end of a tape may vary. More specifically, the means may be adapted to sense a conductive portion at the end of a tape and actuate a solenoid or other means in response thereto. The means may also be adapted to sense a transparency in the tape with a light source—light sensitive diode arrangement to generate a signal for actuation. Also, means may be provided for sensing the point in time at which one of the reel hubs 18–18' ceases to rotate. This may be done by allowing a capacitor to be charged by a rotation of one of the reel hubs 18–18' and dishcarged when rotation ceases thereby generating a signal for actuating.

Although specific embodiments of the invention have been shown and various alternative features described, it is not desired that the invention be limited to any particular form shown or described, and it is intended by the appended claims to cover all modifications within the spirit and scope of the invention.

What is claimed as new and desired to be secured by Letters Patent of the United States is:

1. A magnetic tape apparatus comprising:
- support means;
- dual capstans mounted on said support means;
- dual reel hubs adapted to receive tape reels;
- means for sensing the end of a tape on one of the tape reels;
- reel hub drive means mounted on said support means, said reel hub drive means being movable with respect to said dual reel hubs;
- a carriage overlying said support means and movable between a tape engaging and a tape disengaging position;
- dual pinch rollers movable with said carriage, said dual pinch rollers being movable with respect to said carriage whereby said pinch rollers are relatively movable with respect to said capstans; and a plate mounted on and movable with respect to said carriage between a first and second position in response to said means for sensing when said carriage is in the tape engaging position, said plate including means for selectively moving one or the other of said pinch rollers with respect to one or the other of said capstans and also including means for selectively moving one or the other of said reel hubs with respect to said reel hub drive means when said plate moves from one of the first or second positions to the other, both said means maintaining a first of said pinch rollers out of engagement with a first of said capstans and said drive means out of engagement with a first of said reel hubs in the first position, and said plate maintaining a second of said pinch rollers out of engagement with a second of said capstans and said drive means out of engagement with a second of said hubs in the second position.

2. The apparatus as recited in claim 1 wherein said drive means move with respect to said support means and in response to movement of said plate between the first and the second position.

3. The apparatus as recited in claim 2 including a magnetic head mounted on said carriage and engaging the tape when said carriage is in said tape engaging position.

4. The apparatus as recited in claim 3 including dual erase heads mounted in substantial alignment with said magnetic head when one of said pinch rollers engages one of said capstans.

5. The apparatus as recited in claim 4 wherein said drive means includes a pair of drive members including substantially radially extending arms and projection means extending therefrom, said projection means being alternately engaged by said plate between the first and the second positions thereof to provide for alternate engagement of said dual reel hubs by said pair of drive means.

6. The apparatus as recited in claim 5 including a pivot member pivotally mounting said plate to said carriage to allow pivotal motion of said plate between the first and second position.

7. The apparatus as recited in claim 6 wherein said pinch rollers are pivotally mounted on said carriage on either side of said pivot member and said plate includes engagement means individually moving each of said pinch rollers in the first and second position.

8. The apparatus as recited in claim 7 wherein said plate includes extensions alternately engaging each of said projection means in the first and second position of said plate.

9. The apparatus as recited in claim 8 wherein said plate includes a camming surface and said magnetic head includes a cammed surface, said camming surface acting upon said cammed surface to change the state of elevation of said magnetic head between the first and second position of said plate.

10. The apparatus as recited in claim 6 wherein said pinch rollers are positioned on said plate on either side of said pivot member.

11. The apparatus as recited in claim 10 wherein said plate includes extensions alternately engaging each of said projection means in the first and the second position of said plate.

12. The apparatus as recited in claim 11 wherein said plate includes a camming surface and said magnetic head includes a cammed surface, said camming surface acting upon said camming surface to change the state of elevation of said magnetic head between the first and second position of said plate.

13. The apparatus as recited in claim 5 including guide means secured to said carriage and a substantially linear surface on said plate to provide linear motion of said plate between the first and second position.

14. The apparatus as recited in claim 13 wherein said pinch rollers are pivotally mounted on said carriage and said plate includes cammed surfaces alternately engaging each of said pinch rollers in the first and the second position.

15. The apparatus as recited in claim 14 wherein said plate includes a pair of extensions for alternately engaging said projection means in the first and second position.

16. The apparatus as recited in claim 15 wherein said plate includes a camming surface and said magnetic head includes a cammed surface, said camming surface acting upon said cammed surface to change the state of elevation of said magnetic head between the first and second position of said plate.

References Cited

UNITED STATES PATENTS

| | | | |
|---|---|---|---|
| 3,070,321 | 12/1962 | Bara | 242—55.12 |
| 2,952,416 | 9/1960 | Sampson | 242—55.12 |

HARRY N. HAROIAN, Primary Examiner

U.S. Cl. X.R.

242—201